US008957969B2

(12) United States Patent
Anderson (10) Patent No.: US 8,957,969 B2
(45) Date of Patent: Feb. 17, 2015

(54) METHOD AND APPARATUS FOR CAMERA CONTROL AND PICTURE COMPOSITION USING AT LEAST TWO BIASING MEANS

(71) Applicant: Trace Optics Pty Ltd, South Australia (AU)

(72) Inventor: Jeremy L Anderson, South Australia (AU)

(73) Assignee: Trace Optics Pty Ltd, South Australia (AU)

( * ) Notice: Subject to any disclaimer, the term of this patent is extended or adjusted under 35 U.S.C. 154(b) by 0 days.

(21) Appl. No.: 14/108,436

(22) Filed: Dec. 17, 2013

(65) Prior Publication Data

US 2014/0176720 A1 Jun. 26, 2014

Related U.S. Application Data

(63) Continuation-in-part of application No. 12/990,790, filed on Nov. 3, 2010, now abandoned.

(51) Int. Cl.
*H04N 7/18* (2006.01)
(52) U.S. Cl.
CPC . *H04N 7/18* (2013.01); *H04N 7/181* (2013.01)
USPC .......................................................... 348/157

(58) Field of Classification Search
CPC ........................................................ H04N 7/181
USPC ........................................................ 348/157
IPC ........................................................ H04N 7/18
See application file for complete search history.

(56) References Cited

U.S. PATENT DOCUMENTS

2001/0002843 A1* 6/2001 Yata ............................... 348/169
2007/0268369 A1* 11/2007 Amano et al. ............ 348/207.99

* cited by examiner

*Primary Examiner* — Jay Patel
*Assistant Examiner* — Yulin Sun
(74) *Attorney, Agent, or Firm* — Defillo & Associates, Inc.; Evelyn A. Defillo (57) ABSTRACT

An apparatus for capturing video footage of at least one moving object on a racecourse or sporting field. The video footage includes sequential still pictures each containing a respective image of the at least one moving object. The apparatus including at least one camera mounted on a pan tilt head being configured to follow the movement of the at least one moving object, to thereby capture the video footage, and a controller in communication with the pan tilt head, for controlling the pan and tilt thereof. The controller being used to set the position of a first and a second biasing devices with respect to the limits of a picture frame of said at least one camera. The first and second biasing means are ordered hierarchically by the controller.

15 Claims, 10 Drawing Sheets

METHOD AND APPARATUS FOR CAMERA CONTROL AND PICTURE COMPOSITION USING AT LEAST TWO BIASING MEANS

RELATED U.S. APPLICATION

This application is a continuation-in-part of U.S. application Ser. No. 12/990,790 filed Nov. 3, 2010, entitled, METHOD AND APPARATUS FOR CAMERA CONTROL AND PICTURE COMPOSITION, pending, the content of which is incorporated herein by reference, which is a US national stage entry of PCT/AU2009/000569 filed May 6, 2009, under the International Convention, which claimed priority over Australian Patent Application No. 2008902201 filed May 6, 2008.

FIELD OF THE INVENTION

The present invention relates generally to the field of broadcasting and in one aspect relates to a system for broadcasting a sporting event wherein the position of an object's image, within a camera's field frame, is biasly influenced by at least two biasing means.

BACKGROUND OF THE INVENTION

The popularity of sporting events, increased broadcast capabilities and viewers' preferences have resulted in an increase in television coverage of such contests. There are now dedicated channels on free-to-air, satellite and cable television that provide 24-hour sports coverage.

The capacity of technologically advanced cameras to capture footage of sporting participants and events means that the viewer often has the best "seat in the house" without even having to leave their own home. Technological advances mean that cameras can be mounted within motor cars during race events and within cricket stumps.

Despite these advances many cameras used to capture sporting events are mounted on pan tilt heads and are controlled by an inaccurate human operator. During high speed sports such as motor racing rapid direction changes and complex framing are required. Currently available manually-controlled cameras are deficient in that they rely upon the skill level and reflexes of an operator.

Various camera-tracking systems have been suggested in paper publications that are able to track a target, wherein the target has a radio frequency or GPS tag attached thereto. These systems are however relatively simple and do not take into consideration complex framing and cinematographic composition. Furthermore the footage obtained from such camera systems is often jerky or erratic, which detracts from the viewing experience.

It has been found that when a high speed object are being tracked by existing camera control system, for instance where the target is constrained to a single central position, or any other single position within the picture frame, jerky footage will tend to be generated.

A target constrained to only a single position on the television screen will generally appear clumsy or mechanical. Greater cinematic effect can be created where multiple biasing means are used, such that the movement of the high-speed object is reflected in the movement of the image of the high-speed object within the camera's picture frame. This increases the viewer's experience of the high-speed object while still allowing for a clear well focused and framed image.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

As the reader will appreciate video footage comprises a plurality of sequential still picture. Accordingly, the term video footage used throughout the specification should be understood to be referring to the sequential still picture. The invention generally relates to controlling the position of the image of the object being tracked within the limits of the picture frame of the camera.

The term picture frame, or frame, is used throughout the specification and refers to the edges of the camera lens' field of view, or edges of the image as seen in a television, camera viewfinder or projected image onto a screen.

SUMMARY OF THE INVENTION

In accordance with an aspect of the invention, but not necessarily the broadest or only aspect there is proposed an apparatus for capturing video footage of at least one moving object, on a racecourse or sporting field, the video footage comprising sequential still pictures each containing a respective image of said at least one moving object, the apparatus including, at least one camera mounted on a pan tilt head being configured to follow the movement of said at least one moving object, to thereby capture said video footage, and a controller in communication with the pan tilt head, for controlling the pan and tilt thereof, the controller being used to set the position of a first and a second biasing means with respect to the limits of a picture frame of said at least one camera, characterized in that the first and second biasing means are ordered hierarchically by the controller, wherein the position of the image of said at least one moving object with respect to the camera's picture frame, is influenced by both said first and second biasing means, to control the position of said image of the at least one moving object within said sequential still pictures captured by the camera, said first biasing means having precedence over said second biasing means when determining the position of said image, the movement of said pan tilt head or heads being controlled to obtain video footage, such that the position of the image within one of said sequential still pictures is biased towards, or away from, the position of said first or second biasing means with respect to the position of said image of the moving object in a preceding still picture of said sequential still pictures.

The first and the second biasing means are selected from a group containing, but not limited to, a point having x and y coordinates within the camera's picture frame, a line, having a series of x and y coordinates, traversing at least a portion of the camera's picture frame, or a target frame comprising a portion of the camera's picture frame, such that the position of the image of said object within the camera's picture frame is biased towards or away from, said point, line, or target frame, as the sequential still pictures of the video footage are captured by said at least one camera. Preferably the first and second biasing means are different.

A camera operator or motorized controller can be said to keep a car in frame by panning with it as it speeds past. In addition, the term point refers to a geometric element having a position located by coordinates, but no magnitude.

In a further aspect of the invention there is proposed an apparatus for capturing video footage of a moving object, including a plurality of movable cameras controlled by a controller, the controller being in communication with a tag device attached to said object such that at least one of said plurality of cameras tracks the movement of said object, wherein the position of an image of said object, within a respective camera's picture frame, is biased or influenced by at least two biasing means.

In one form the biasing means is a point within the camera's picture frame, or a magnetic line traversing at least a portion of the camera's picture frame. The position of the image of said object within the picture frame may be biased towards said point or magnetic line.

In another form the biasing means is a target frame within the camera's picture frame. The position of the image of said object within the camera's picture frame may be biased away from the target frame, such that the image of the object is retained within the target frame, and biased towards the centre of said target frame. The target frame may be located at any position within the frame to primarily allow for compositional requirements, but also to compensate for advertisement or statistics tables that may be incorporated into the broadcast images. The target frame may form any 20 shape which includes all rectangular, circular and oval shapes.

The biasing means may be a combination of a point, magnetic line and target frame that influences the position of the image of said object within the camera's picture frame. There may be a hierarchical system used to determine which biasing means influences the position of the image. It should be appreciated that different combinations of the biasing means could be used and may be changed.

Alternatively a user could change the position of the biasing means depending upon the footage that is required.

The tag device may be an active or passive tag that is attached to the object and is recognizable by the controller.

In one form the tag may be an active RFID tag, which may contain a battery and can transmit a radio-frequency signal autonomously. The active RFID tag will generally contain an integrated circuit for storing and processing information, modulating and/or demodulating a radio-frequency (RF) signal. The active tag typically also contains a transmitter attached to an antenna for transmitting a RF signal and may contain a receiver.

In another form the tag is a passive tag, which require an external source to initiate signal transmission. The passive tag may include special materials applied to the object or inserted into the object, readable information contained on a device such as a silicon chip, memory chip or any other device that can be read without physical contact between the detection means and the passive tag.

In one form the passive tag may include a reflection prism, bar code, microwave detectable means, microchip or be marked with RF readable alphanumeric.

The apparatus may be configured to track a plurality of objects each preferably having a respective tag device attached thereto.

In another aspect of the invention there is proposed a method of tracking at least one moving object on a racecourse or sporting field with at least one camera to obtain video footage of the moving object, the footage comprising sequential still pictures each containing a respective image of said at least one moving object, including the steps of: controlling at least one camera using a controller to track the movement of object;

moving the camera such that the position of an image of said object within the camera's picture frame, is biased or influenced by at least two biasing means.

The at least two biasing means may be a point within the camera's picture frame, or a magnetic line traversing at least portion of the camera's picture frame, or a target frame within the camera's picture frame, or a combination thereof.

In one form the method includes the steps of:

using a controller to set the position of a first and a second biasing means with respect to the limits of a corresponding picture frame of said at least one camera;

determining which of said first and second biasing means has precedence and using the controller to order the first and second biasing means hierarchically;

controlling the at least one camera mounted on a pan tilt head using said controller to track the movement of the moving object, the pan tilt head being configured to pan and tilt to enable said, at least one camera, to capture said video footage of the moving object; and adjusting the movement of said pan tilt head or heads by way of the controller, such that the position of the image of said moving object within the camera's picture frame, is influenced by said first and said second biasing means, such that the position of the image within one of said sequential still pictures is biased towards, or away from, the position of said first or second biasing means with respect to the position of said image of the moving object in a preceding still picture of said sequential still pictures.

In one form the method includes the further step of ordering a plurality of tagged objects so that the controller can be used to select and deselect preferred objects for which video footage will be obtained using the video capturing device.

A broadcast manager may be in control of said camera and the ordering of tagged objects by way of a controller, wherein said manager determines the type of video footage obtained.

In yet another aspect of the invention there is proposed an apparatus for capturing video footage of a vehicle crash event, including a camera configured to selectively follow the movement of a vehicle to which a tag device is attached wherein the position of an image of said tagged vehicle within a picture frame is biased or influenced by at least two biasing means, and a controller configured to analyze the movement of a tagged vehicle to anticipate if said vehicle is going to be involved in a future crash event, the controller including a virtual map of the race course and a data source having information relating to expected vehicle race lines, vehicle turning radius at specified speeds and conditions, and recommended maximum cornering speeds, wherein if said vehicle deviates from the expected race line or has a race alignment and speed that indicates a collision, or has a cornering speed that exceeds the recommended maximum cornering speed, or onboard accelerometers indicate a bump or crash, then said camera is controlled to follow and frame the movement of said vehicle in a specified manner.

In one form the control device can calculate the expected trajectory of said vehicle to determine the expected position of said crash event at the point where the expected trajectory of the vehicle intersects a roadside barrier, information of which is contained within said virtual map. This crash point may be used by the apparatus's cameras and system in their automated framing methods.

In still another aspect of the invention there is proposed an algorithm for controlling the operation of the preceding apparatus and for the apparatus's applications. In one form the algorithm is contained within a software program. The software program may be implemented as one or more modules for undertaking the steps of the present invention. The modules can be packaged functional hardware units for use with other components or modules. Multiple processing units may be used to control the operation of the apparatus.

Some of the components of the apparatus may be connected by way of a communication means such as, but not limited to, a RF Link, a modem communication path, a computer network such as a local area network (LAN), Internet, or fixed cables.

In one form the broadcast controller includes a computer having memory in the form of random access memory (RAM) and read-only memory (ROM), a central processing unit or units, input/output (IO) interfaces and at least one data storage device. The computer includes application software for controlling the servo encoded pan tilt heads, servo encoded zoom and focus lenses, and for undertaking the task of processing input data.

The processor and the memory cooperate with each other and with other components of a computer to perform all of the functionality described herein. In another form the processor executes appropriate software to perform all of the functionality described herein. In an alternate form, some or all of the functionality described herein can be accomplished with dedicated electronics hardwired to perform the described functions.

Application software may be stored in a computer readable medium on a storage device such as a floppy disk, a hard drive, a magneto optical disk drive, CD-ROM, magnetic tape, integrated circuit, a radio or infrared transmission channel between the computer and another device, a computer readable card such as a PCMCIA card, a flash drive or any other of the number of non-volatile storage devices. The foregoing is merely exemplary of relevant computer readable mediums. Other computer readable mediums may be practiced without departing from the scope of the invention.

In another form the apparatus includes embedded software or firmware with corresponding hardware that is designed to perform one or more dedicated functions of the present invention.

BRIEF DESCRIPTION OF THE DRAWINGS

The accompanying drawings, which are incorporated in and constitute a part of this specification, illustrate implementations of the invention and, together with the description and claims, serve to explain the advantages and principles of the invention. In the drawings.

FIG. 3 a is a schematic view illustrating a first biasing means of the present invention to obtain footage of the object;

DETAILED DESCRIPTION OF THE ILLUSTRATED AND EXEMPLIFIED EMBODIMENTS

There are numerous specific details set forth in the following description. However, from the disclosure, it will be apparent to those skilled in the art that modifications and/or substitutions may be made without departing from the scope and spirit of the invention. In some circumstances specific details may have been omitted so as not to obscure the invention. Similar reference characters indicate corresponding parts throughout the drawings.

Figure 1:
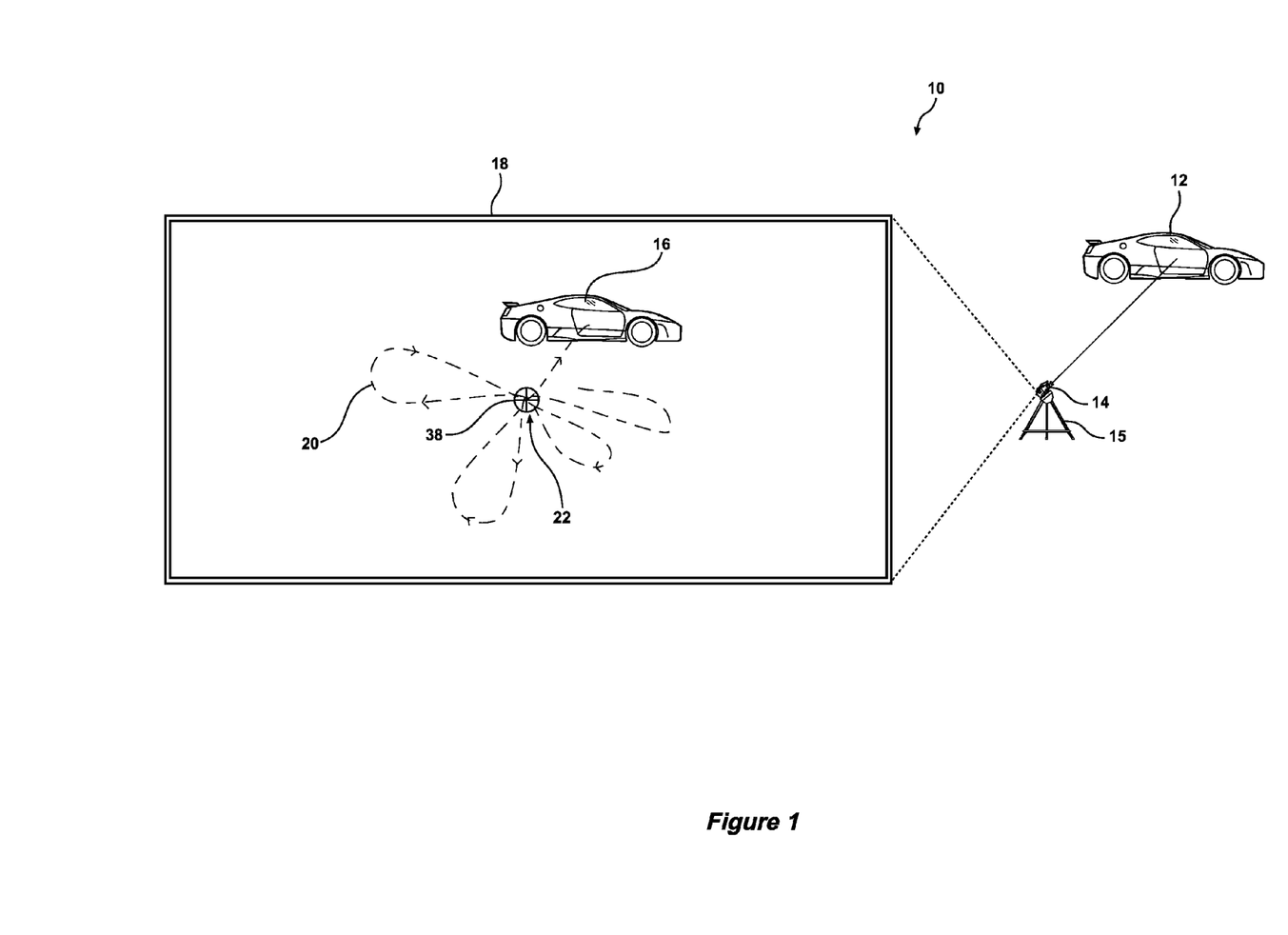
FIG. 1 is a schematic view of an embodiment of the biasing means of the present invention used to position the image of the object within the picture frame.

Referring to the drawings for a more detailed description, an apparatus 10 for capturing video footage of a moving object 12 is illustrated, demonstrating by way of examples, arrangements in which the principles of the present invention may be employed. As illustrated in FIG. 1 the apparatus 10 includes at least one camera 14 mounted on tripod 15 configured to follow the movement of object 12, wherein the position of an image 16 of the object 12, within a camera's picture frame 18, is biased or influenced, by at least two biasing means 22. The apparatus 10 can also include multiple cameras 14 that are linked 21.

Figure 2:
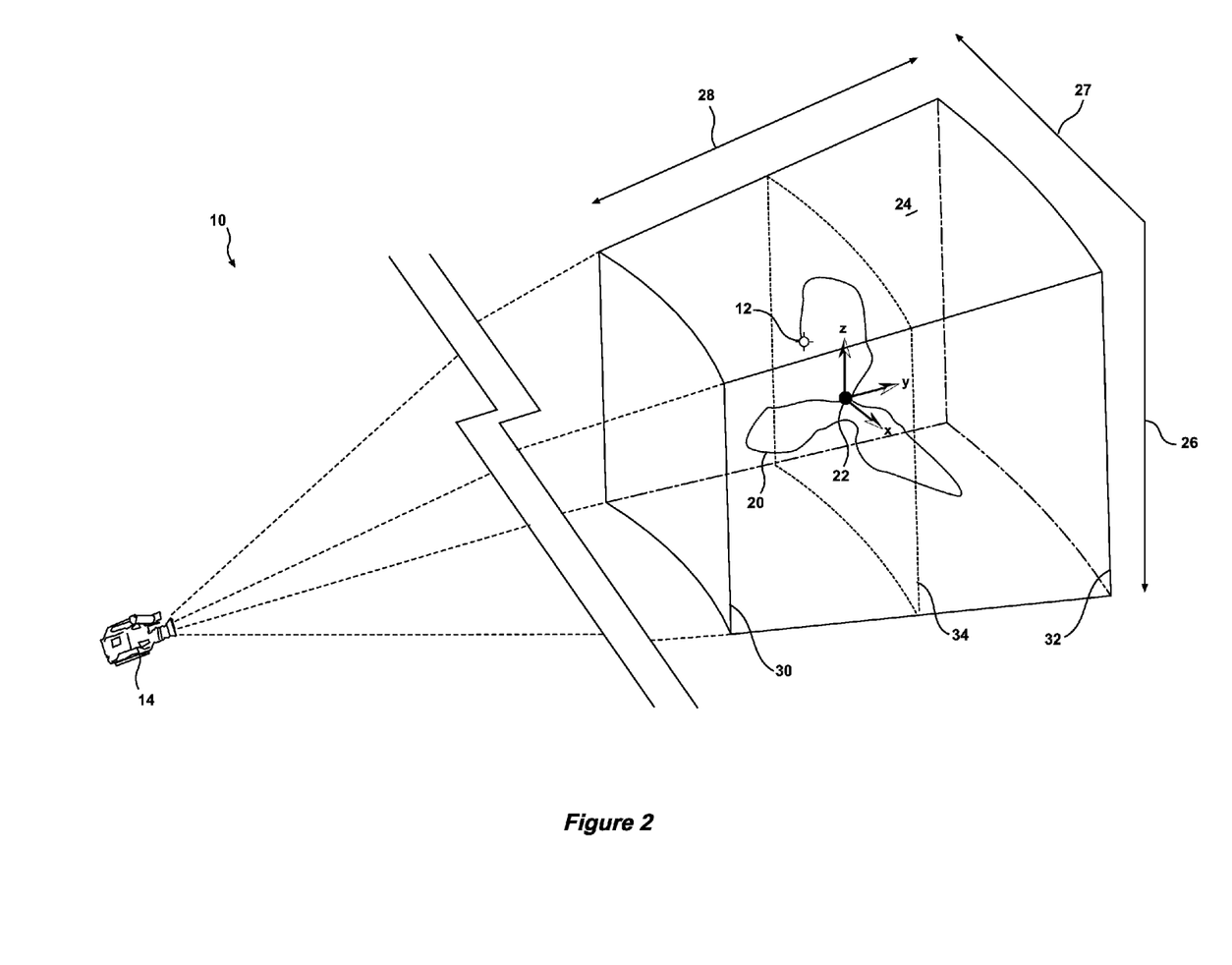
FIG. 2 is a perspective view of the biasing means of FIG. 1 with respect to the three-dimensional space defined by the cameras lens.

To fully comprehend the present invention it is important to firstly examine the way in which video footage is obtained by the camera 14. As illustrated in FIG. 2 the picture frame is a two-dimensional image of a three-dimensional space 24. This three-dimensional space 24, within which objects are in focus, is defined by the field of view defined by height 26 and width 27, and depth of field 28 of the camera 14. The depth of field 28 has a minimum plane 30 and maximum plane 32 which are defined by the objective distances along the optical axis where an object appears to be "in-focus", outside of this range an object will appear out of focus. Midway between the minimum 30 and maximum 32 extremes is plane 34, where the object will be at optimal focus. It should be appreciated that the minimum plane 30, maximum plane 32 and plane 34 are all curved. This is called the field curvature and is an attribute of the camera's lens.

It is envisaged that the biasing means or biasing parameter 22 of the present invention will be placed on plane 34. The biasing means 22 can be a point, magnetic line or target frame that is configured to attract or repel the image within the camera's picture frame 18. As indicated by the object's path of travel 20 on the camera's picture plane, where the biasing means 22 is a point configured to attract the image 16, the object 12 may be able to move, within the three-dimensional space 24, along axes 25, such as x, y, z, as shown in FIG. 2, or simply two axes.

Figure 3A:
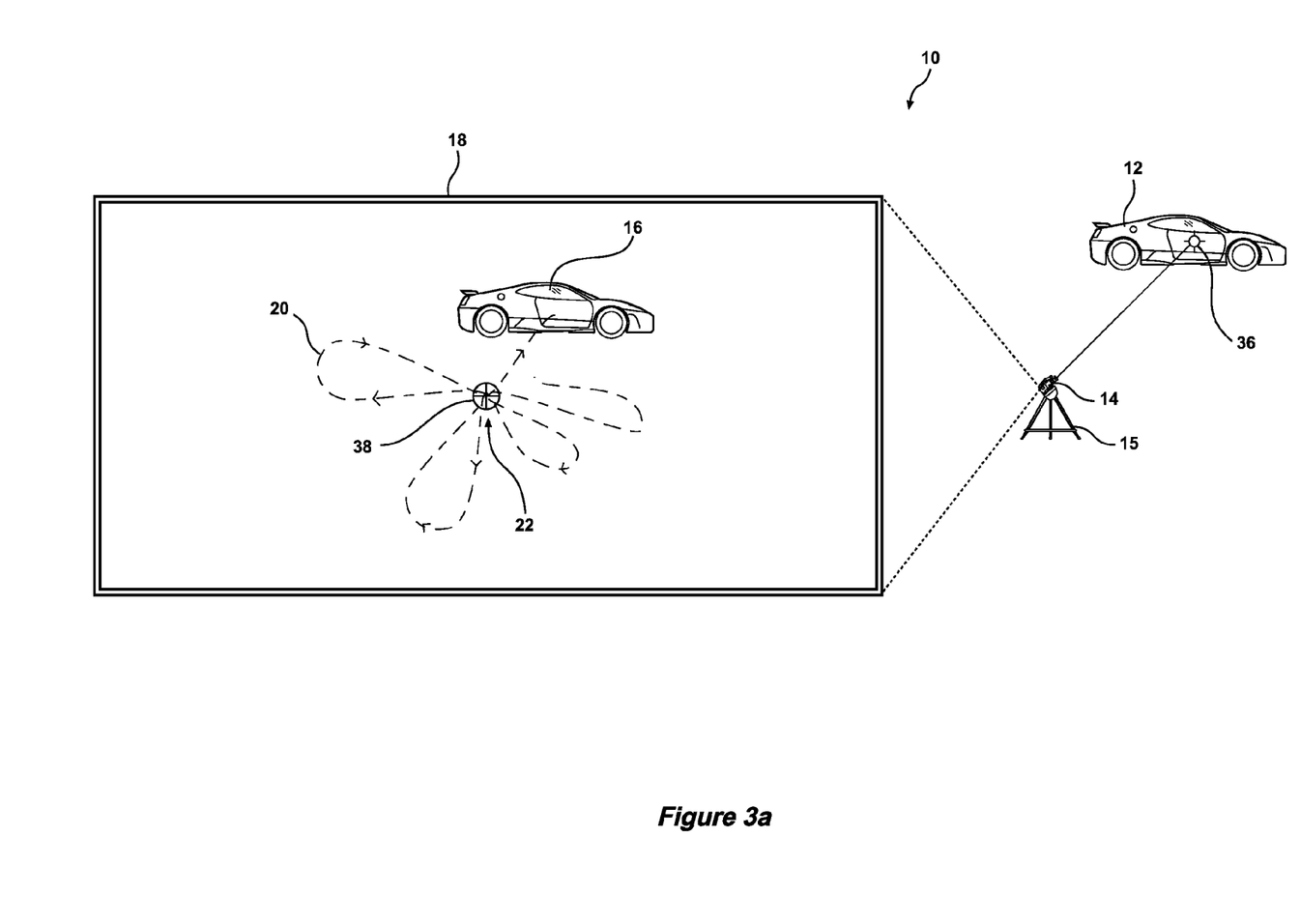
Figure 3B:
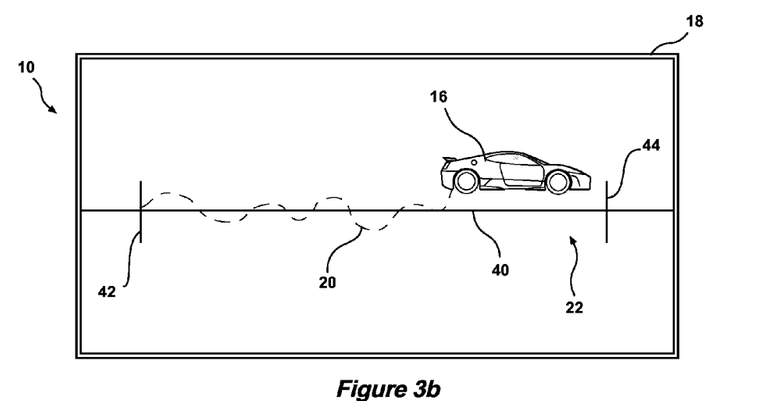
FIG. 3b is a schematic view illustrating a second biasing means.

As illustrated in FIG. 3a, a radio frequency tag 36 is attached to the object 12. In this way the object's position within the camera's picture frame 18 is known and the camera can move accordingly to capture footage of the object 12. The use of a biasing means reduces jerky movement of the camera that may lead to viewer discomfort. As further illustrated in FIG. 3a the biasing means 22 may be a point 38 that can be positioned at any location on the picture frame 18. Alternatively, as illustrated in FIG. 3b the biasing means 22 is a magnetic line 40, having a start point 42 and end point 44. The apparatus 10 can be configured so that the camera follows the object for a selected period of time such that the image 16 drifts along the magnetic line 40 from the start point 42 to the end point 44 being biasly weighted towards magnetic line 40 but being capable of drifting away therefrom.

Figure 3C:
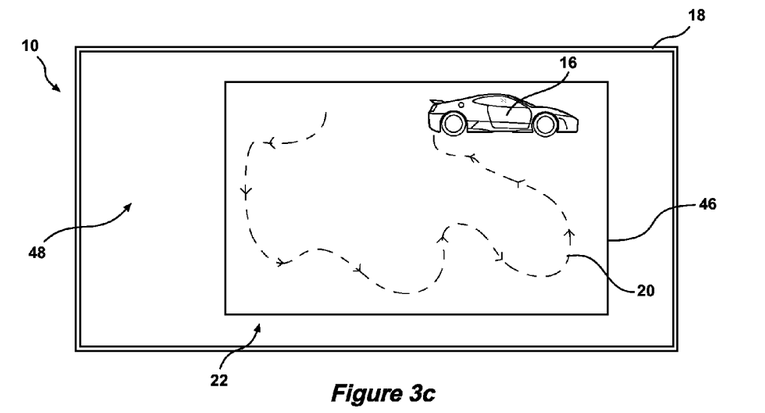
FIG. 3c is a schematic view illustrating a third biasing means.

In a further embodiment, as illustrated in FIG. 3c, the biasing means 22 is a target frame 46 within which the image 16 of the object 12 is biasly retained within the frame. The target frame 46 ensures that the image does not move outside a predefined area 46 of the screen but is nevertheless allowed a degree of movement. Therefore as the image 16 approaches the target frame 46 the camera is moved so that the image's position is changed to ensure it does not exit the target frame 46. This embodiment may be used so that results or statistics can be selectively placed in a blank area 48 on the broadcast image without interfering with the image 16 of the race participant.

Figure 3D:
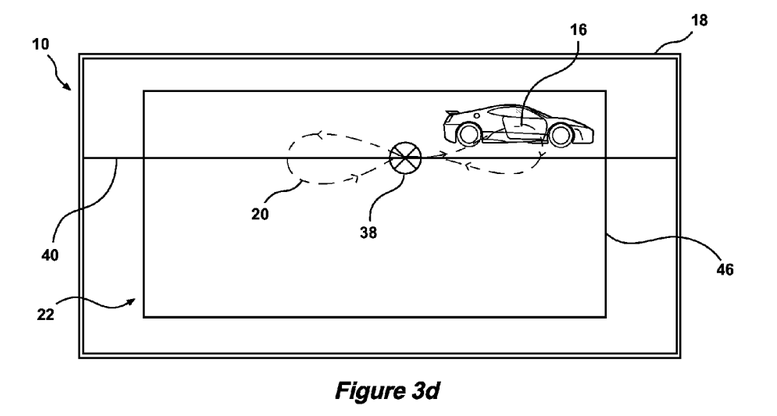
FIG. 3d is a schematic view illustrating the use of the first, second, and third biasing means to obtain a footage of the object.

In yet a further embodiment, as illustrated in FIG. 3d, the biasing means 22 comprises a marker point 38, magnetic line 40 and target frame 46 that controls the path of travel 20 of the image 16 and the movement of the camera 14 depending upon the position of the image 16 on the camera's picture frame 18. It should be appreciated that other shapes and configurations of the biasing means 22 could be used.

The skilled addressee would appreciate that the further the object's image 16 moves away from, or toward, the biasing means 22 the stronger the influence will be. As the reader will appreciate this will be dependent upon whether the biasing means 22 is set to attract or repel the image 16. By increasing the magnetic weighting of the biasing means 22 the path of travel 20 of the object's image 16 within the picture frame 18 away from or towards the biasing means 22 can be changed. Hence the operator is able to restrain the movement of the target or targets within the picture frame or alternatively allow a relatively large amount of movement of the image 16 within the picture frame 18. Movement of the image 16 within the picture frame 18 is based upon the image's 16 speed and direction of travel, and the magnetic weighting of the biasing means 22. The strength properties of the magnetic weight of the biasing means 22 includes but are not limited to, directly and inversely proportional behaviour, linear relationship behavior, and logarithmic proportional behavior. The size of the magnetic area surrounding the biasing means 22 within the picture frame 18 can be adjusted by the operator.

The apparatus is useful for sporting events such as motor racing and ball sports where the targets are moving at high speeds and are difficult to frame without rapid movement of camera, which unfortunately often produces footage that is jerky and less than desirable. The present invention provides a system for obtaining close-up footage without erratic movement of the picture.

When an operator is selecting an object 12 and a biasing means 22 referred to here as the marker point 38 is active, then the target is restrained around the marker point 38. The image 16 continues to stay on or close to the marker point 38 proportional to the calibrated magnetic strength of the marker point 38. The reader will now appreciate that a marker point 38 with high magnetic strength holds the image 16 firmly on to it, while a marker point with a low magnetic strength permits the image 16 to drift away and back to the marker point depending on the speed and direction of the target.

The principle function of the magnetic line 40 as illustrated in FIG. 3b is to bring the image 16 close to the magnetic line 40 via the shortest route, and keep it on the magnetic line, proportional to the specified magnetic strength. The magnetic line 40 may be a straight line as illustrated in FIG. 3b or it may be curved or shaped into any profile. The magnetic line 40 traverses the picture frame 18 at any angle or curve and at any location within the picture frame 18. An optional feature is that the operator can specify how the target travels along the magnetic line 40 by nominating speed of travel with an entry 42 and an exit point 44. The magnetic weighting, which allows for drifting of the object's image 16 produces a smooth visual cinematic sequence between points 42 and 44.

The magnetic line 40 requires four specified calibrations, firstly a percentage calibration which governs the strength of the magnetic attraction, secondly the size of the magnetic area or field surrounding the line 40, thirdly a percentage calibration governing the speed that the object 12 can travel along the magnetic line 40, and fourthly the acceleration or deceleration at which the target visually bounces off the target frame 46 or picture frame 18.

The second and third calibrations involving speed and acceleration, and other live commands and presets can be linked to the master default setting, which can be used by all cameras 14 in the system.

The target frame 46 as illustrated in FIG. 3c enables a singular image 16 or multiple images to be confined within the frame 46. As such the target frame also controls the camera lens' zoom calibration to ensure that multiple selected images 16 remain within the target frame 46 at all times regardless of their grouped or dispersed location. As with all of the biasing means 22 the target frame 46 can be activated or deactivated at any stage during camera operation. When active the selected target or targets are restrained within the target frame 46. The edge of the target frame 46 has a magnetic weighting such that the object's image 16 is repelled.

This means that the object's image 16 remains within the predetermined area of the picture frame 18 however is still able to move or drift because of its own speed and changes in directions. This means that the cinematographic sequence will be smooth even in the event that the target is moving randomly and rapidly. The target frame is able to be adjustable in size, shape and location, thus creating a variable negative space between the target frame and picture frame. Shapes of target frames 46 include squares, rectangles, ovals and circles.

It should be noted that the target frame 46 can be used with dynamic tagged objects such as a soccer ball and static tagged objects such as a soccer goal, so that the two objects will always be within the target frame 46.

It should also be noted that it can be used with two dynamic tagged objects such as a cricket player and the cricket ball.

The target frame's 46 four calibrations are; strength, size, speed and acceleration. The following is an elaboration of these:

Strength calibration—100% (the highest) pushes the object's image 16 furthest away from the edge of the frame

46. 0 % Strength calibration allows the target to float (according to its own direction) within the frame and touch the edge of the frame 46.

Size calibration expands and contracts the size of the frame. Size calibration 100%—target frame 46 equals size of the picture frame 18. Size calibration 600% equals target frame six times larger than picture frame 18. Size calibration 50% equals target frame 46 half picture frame 18.

The speed of the image 16 within the target frame must be specified. For instance, specifying the master default will use the calibrations of the master default pan speed.

Acceleration within the target frame must be specified. For instance, specifying the master default will adopt those pan tilt acceleration calibrations.

Maximum and minimum zoom speeds can be individually specified or can be defaulted from the master default zoom speeds. Specified maximum and minimum zoom speeds stop excessive blurring and provide a desired working range.

The target frame 46 works in conjunction with the zoom function, thus as the selected targets visually spread out and touch the target frame, the automatic zoom zooms out enabling all selected targets 12 to remain within the target frame 46. As the selected targets converge, the zoom increases. If the target frame 46 is off then the picture frame 18 becomes the defining edge for the automatic zoom function.

The target's path or drift 20 through the target frame 46 has four options, which must be specified.

Engage other ordering devices e.g. the magnetic line or marker point with the target frame.

The target may drift within the frame according to its own direction.

The angle of collision on the target fame equals a reflected angle of deflection.

The target is bounced off the target frame towards the centre after it contacts the frame.

In a further embodiment the tracking system can determine the trajectory of a ball being tagged and can identify a landing zone and the tagged players closest to that landing zone. As such a target frame 46 can be used to frame both tagged player and ball as both objects collide. Alternatively the operator may simply frame the player closest to the landing zone in a previously specified manner.

Figure 4:
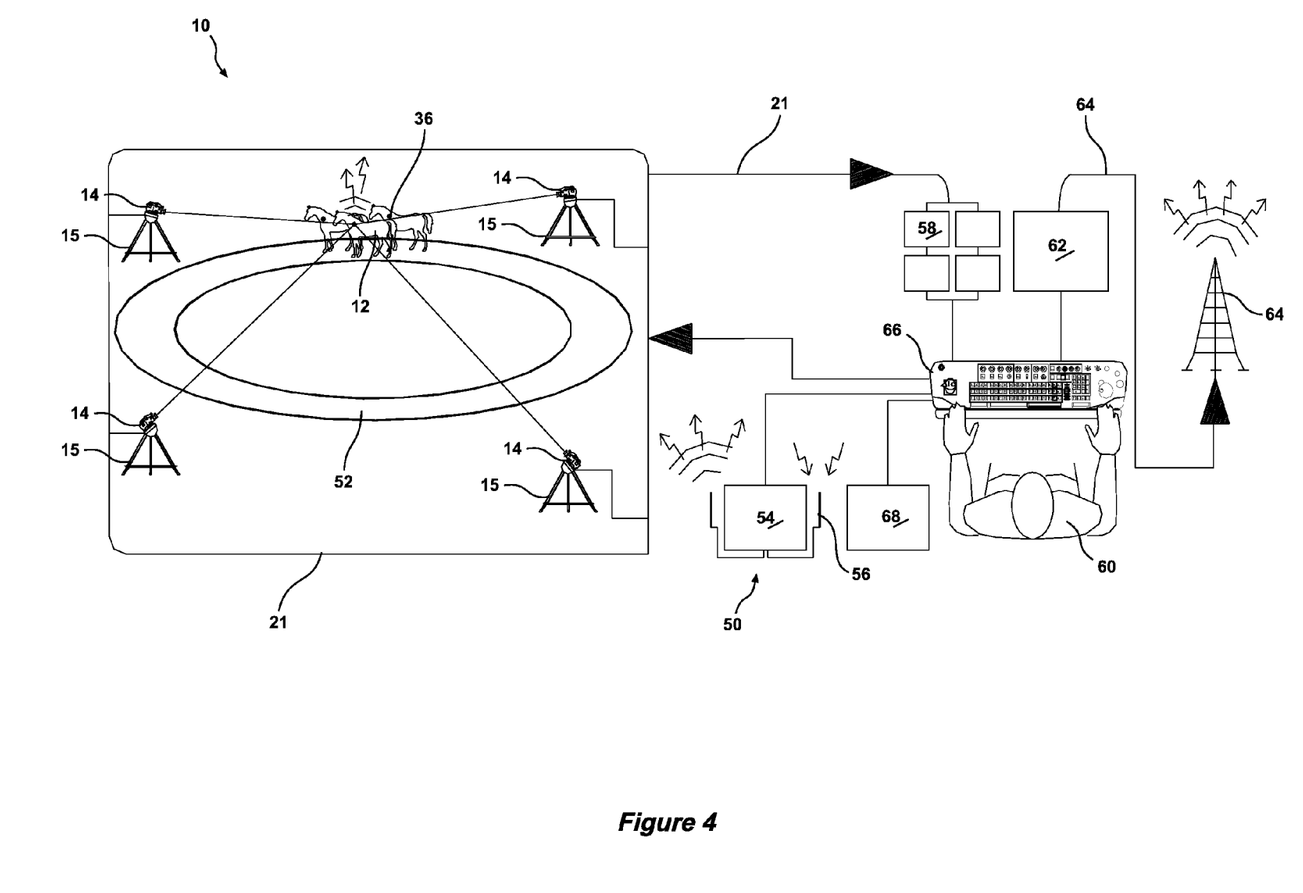
FIG. 4 is a schematic view of an embodiment of the apparatus of the present invention.

In a further embodiment, as illustrated in FIG. 4, the apparatus 10 comprises a radio frequency tracking system 50 that uses triangulation to locate selected objects 12 having respective RF tags 36 attached thereto. The selected objects 12 are within a preselected area such as a race course 52 comprising track 53 and barrier 98. It should however be appreciated that other tracking systems can be used, such as radar type tracking, optical recognition or DGPS devices. The tags 36 may be either active or passive as is well known in the art.

The apparatus 10 further includes a central processing unit 54 (CPU) and receivers 56. It is envisaged that the system 10 will include a plurality of receivers coupled to respective antennae which are located around the race course 52 or sporting field. Each receiver 56 is linked via fibre optic cabling or telemetry back to the tracking CPU 54.

This tracking CPU 54 relays to the camera CPU 68 the exact location of each tagged object 12. Cameras 14 can be zoomed in and focused on the desired tagged targets 12. The camera CPU 68 relays the pan, tilt, zoom and focus requirements to the cameras 14 by way of fiber optic cabling or alternative by way of a transmitter (not shown). The images 58 captured by the plurality of cameras 14 are conveyed back to the CPU 68 and the operator or director 60 is able to select the cinematic picture 62 suitable for broadcasting 64.

It is envisaged that each camera 14 will incorporate a servo encoded pan tilt head with tripod support as is well known in the art. However, the reader should appreciate that other camera operating system can be used including boom-mounted and dolly mounted cameras, and cameras suspended from cables in a flying fox configuration. Broadcast cameras and lenses are mounted on the servo encoded pan tilt heads, which align their pan tilt axes with dynamic accuracies of 0.03 degrees or better at the targets 12.

The controller 66 facilitate use of the various aspects of the invention and typically have ergonomic controls, joy sticks, live and preset function keys, calibration dials and a variety of computer-based commands enabling detailed and progressive composition of the cinematic pictures. The controller 66 incorporates the CPU 68 and the camera screen interface 62. Where several cameras or computers are being used, they will all be linked to the central processing unit 54.

The software commands can be utilized by individual cameras 14 and also by a Director who can manage all selected cameras 14 in a coordinated network.

The apparatuses' software commands can be broken into four basic distinct groups and are as follows:

Target lock-on—these commands enable the operator to capture desired tagged target or targets and track them using a camera or cameras. These commands include: engaging automatic mode; manual entry of target number; addition and subtraction; travelling keys; and priority targets.

Biasing Means 22—the marker point 38, magnetic line 40 and target frame 46 can be set individually for each camera 14, or all cameras can utilize the master default biasing means 22. Biasing means 22 enable aesthetic framing, proportion, target placement within picture frame, speed and acceleration.

Live commands—these commands enable selected target or targets to be viewed and visually sequenced in a prescribed manner. These commands include: dynamic zoom shift; dynamic pan shift; collision framing; destination framing; and repeat.

Director's override—these commands enable the director to override individual operator controls and presets, and facilitate the coordination of all servo encoded pan tilt heads and associated cameras in a variety of ways. These commands include: unification; directors presets; accident aware; priority targets; and graphics allowance. The tag 36 attached to each object 12 may emit a different individual frequency. This means that each of the targets 12 can be identified with an assigned number that appears within a target's icon on the operators screen 62. The target icon that appears on the operator's screen 62 can be selected by typing the associated number using the function keys or by moving crosshairs over the object's image 16 using a mouse or joystick. Target lock-on enables the operator to select one or more targets and frame them within the predetermined frame or portion of the picture frame. It is envisaged that there will be several different ways of locking onto or selecting a target. Some of the methods are as follows:

When changing from manual mode to automatic mode the system recognizes any targets within the target frame (if active) and locks on automatically.

Manual entry, which requires the operator to key in the target's 1.0. number via the controls. Similarly targets can be removed by entering for example "-X enter" using the function keys.

Priority targets are selected by the director on the master control which is then relayed to the individual operators. The operator may switch automatic priority targets to active, which will automatically lock-on to the priority target when within camera viewing area. When priority targets are within the specified camera viewing area, the target icon both on the screen and in the target order will flash red until it has been selected. The priority target icon when selected remains red.

Addition and subtraction keys on the controls are used to add or remove targets from the selected targets. There are two sets of addition and subtraction keys. The first set of keys controls the adding or removing from the front selected targets, e.g. from the leaders. The second set of keys controls the adding and removing from the rear of the selected targets, i.e. from the followers. This is particularly useful under race conditions.

Travelling keys can also be used in changing selected targets. If two targets have been selected i.e. 2nd & 3rd place and the positive travelling key is pressed then the selected targets become 1st & 2nd place. Similarly, pressing the negative travelling key when 2nd & 3rd place are selected will result in 3rd & 4th place being tracked.

If the automatic function is selected and no targets are being tracked, the function keys can be used to select the target closest to the centre of the picture frame, or the target nearest a preselected point or magnetic line within the picture frame.

Figure 5:
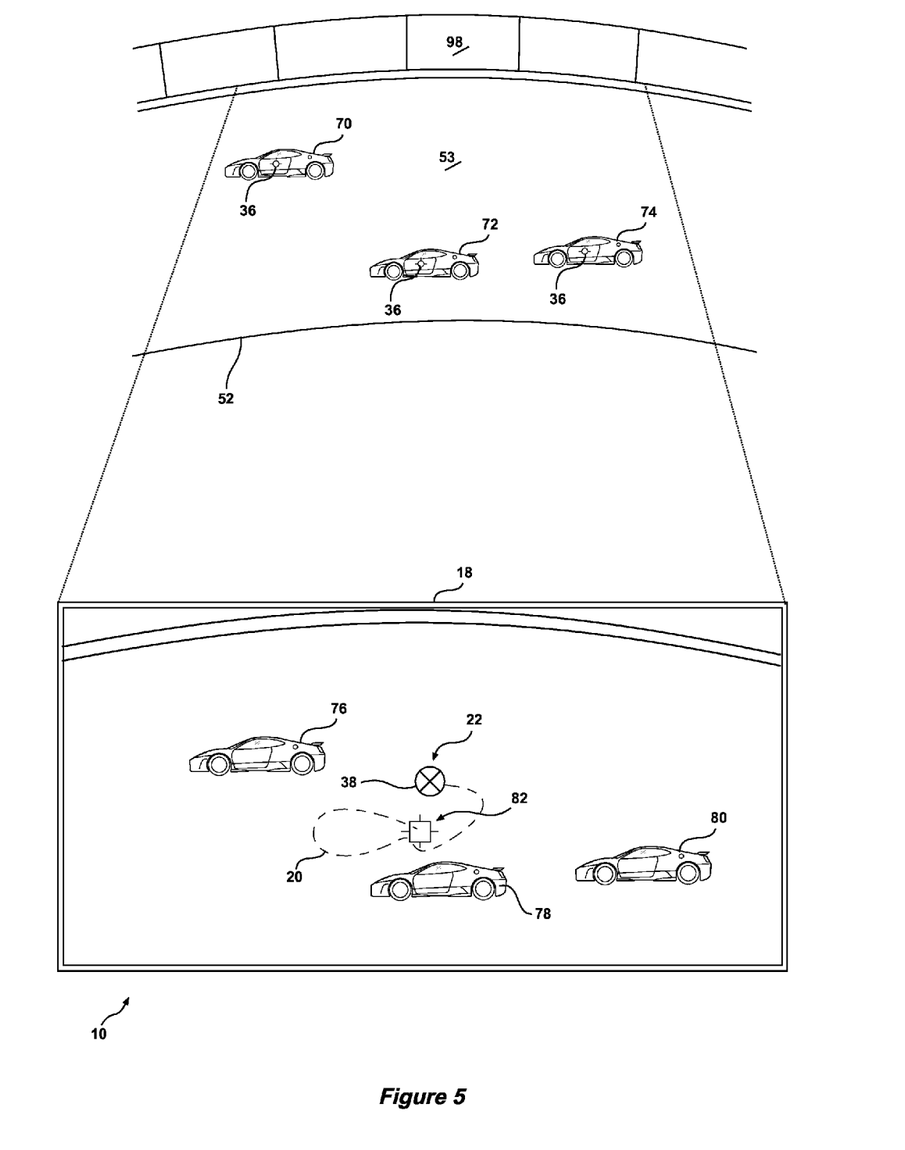
FIG. 5 is a schematic view of a picture frame illustrating the position of a number of tracked targets and a mean target icon used in the present invention.

As illustrated in FIG. 5 the apparatus 10 can be used to track a number of objects. In the present example race vehicles 70, 72, 74, to which respective tags 36 are attached, are tracked by apparatus 10. The position of the respective images 76, 78, 80 within the camera's picture frame 18 are determined by the mean target location (MTL) 82 that is influenced by the biasing means 22, in this example being a point 38. When two or more objects have been selected and the target frame and the automatic zoom are active, then the zoom will automatically maximize the zoom calibration while still retaining all the selected targets within the camera's picture frame 18 or a specified target frame 46.

When two or more objects 12 are selected then the MTL icon 82 will appear on the screen 62. The MTL 82 becomes the defined target's location within the picture frame 18 when determining picture composition with the biasing means 22.

Acceleration and deceleration zoom calibrations can be preset to ensure that the camera does not move too quickly which may lead to viewer discomfort. Automatic zoom is enabled when the system is in the automatic mode and a target or targets have been selected. The automatic zoom, when used in tracking a single target, enables the selected target to stay as a fixed proportion or fixed visual size of the target frame. Thus the target appears not to change in size as its focus changes and the automatic zoom adjusts. The operator can still change the automatic zoom setting via the controller 66, after which the latest setting and thus visual size becomes the default setting.

Automatic focus is enabled when the system is in automatic mode and a target or targets have been selected. Because the target is being tracked the subject distance between camera and target is a known value and the system is calibrated to ensure that the target is in focus at all times. It is therefore important for the operator to specify one of the following parameters for this command:

1. Use the mean target location (MTL) as the focal length, or
2. Use the leading target for the focal length calculation, or
3. Use target closest to screen centre point (CP) for the focal length calculation, or
4. Use best fit, which uses both MTL and CP for calculation.

If the biasing means 22 are not active and an object 12 is selected, then the object's image 16 will remain in the same location within the picture frame 18 as it was when it was initially selected. The operator can shift this selected target or mean target location within the picture frame 18 via the live interaction mode through the joystick or any other mechanism. If the centre point of the picture is on the live interaction mode the operator can shift the target away from the centre point of the picture, but once joystick pressure is released then the target will move back to the centre point. Live interaction mode can be used within all commands with the exception of director's override commands.

Pan & zoom acceleration are individually adjustable percentage calibrations, which govern the rate that an object image 16 travels across the picture frame 18 and the zoom speed. High percentages correspond to sharp and aggressive changes. Low percentages give gentle and slow changes. The master default pan and zoom acceleration and speed are specified in the system preset and govern all pan and zoom acceleration and speed settings within the commands, on the proviso that the commands are set to master. Each command can have its own specified pan and zoom acceleration & speed calibrations.

The speed bar governs the speed (forward and reverse) at which the dynamic zoom, dynamic pan and live commands are performed. For example, if a dynamic pan command is engaged with a specified pan speed of 50% (moderate) and the speed bar is pushed fully forward, then the choreographed dynamic pan command will increase its pan speed to 100%. In effect the speed bar combines all specified pan and zoom acceleration & speed calibrations and collectively and proportionally changes them depending on the movement of the speed bar. The master pan and zoom acceleration & speed are utilised in a variety of live commands and presets. These include automatic zoom, dynamic pan, changing selected targets, and camera story lines. Master pan and zoom acceleration & speed have percentage calibrated, which are governed by individual calibrated dials on the control interface.

Dynamic zoom is a live command that zooms in or out on specified selected targets. For each dynamic zoom the operator must specify the:

Pan start point and finish point locations.
Start and finish zoom calibration.
Zoom speed and acceleration.

Specifying the vehicle type, scenario number, creating a scenario and the zoom and pan calibrations for speed, acceleration, start and finish points is all performed through the CPU 68. The software has many standard dynamic zooms in the library and facilitates additional dynamic zooms to be created, catalogued and loaded for future use. Numerous dynamic zoom and dynamic pans can be linked together into a single live command. All live commands (eg. a dynamic zoom) have a genesis scene, which is created from the command start point, zoom calibrations and ordering biasing means 22. If the live command button on the controller 66 is pressed and held down then the dynamic zoom scene will remain at the genesis scene calibrations. This action is called a genesis hold. When the button is released then the remainder of the command will be instigated. Each choreographed scenario is performed at specified speed and acceleration rates. These combined rates may be changed using the speed bar. The speed bar enables the choreographed scene to be sped up or even reversed.

A dynamic pan function pans across a selected target or targets from a specified pan start point to a specified pan finish point along a specified travel path with intermediate points, within specified pan speed, pan acceleration and zoom calibrations. The command itself is intrinsically the same as the dynamic zoom shift, except one is calibrated for zooming and the other panning. This is useful for the operator in organising the commands. The pan shift command requires a specified path of travel upon which the target tag or the MTL of numerous targets travels. The software facilitates dynamic pans to be created, catalogued and loaded for future use. Each dynamic pan scenario can be loaded onto a live button. As the reader would now appreciate a dynamic pan command enables panning from the front of the selected vehicle (i.e. F1) to its rear at a specified pan and zoom calibration.

Figure 6:
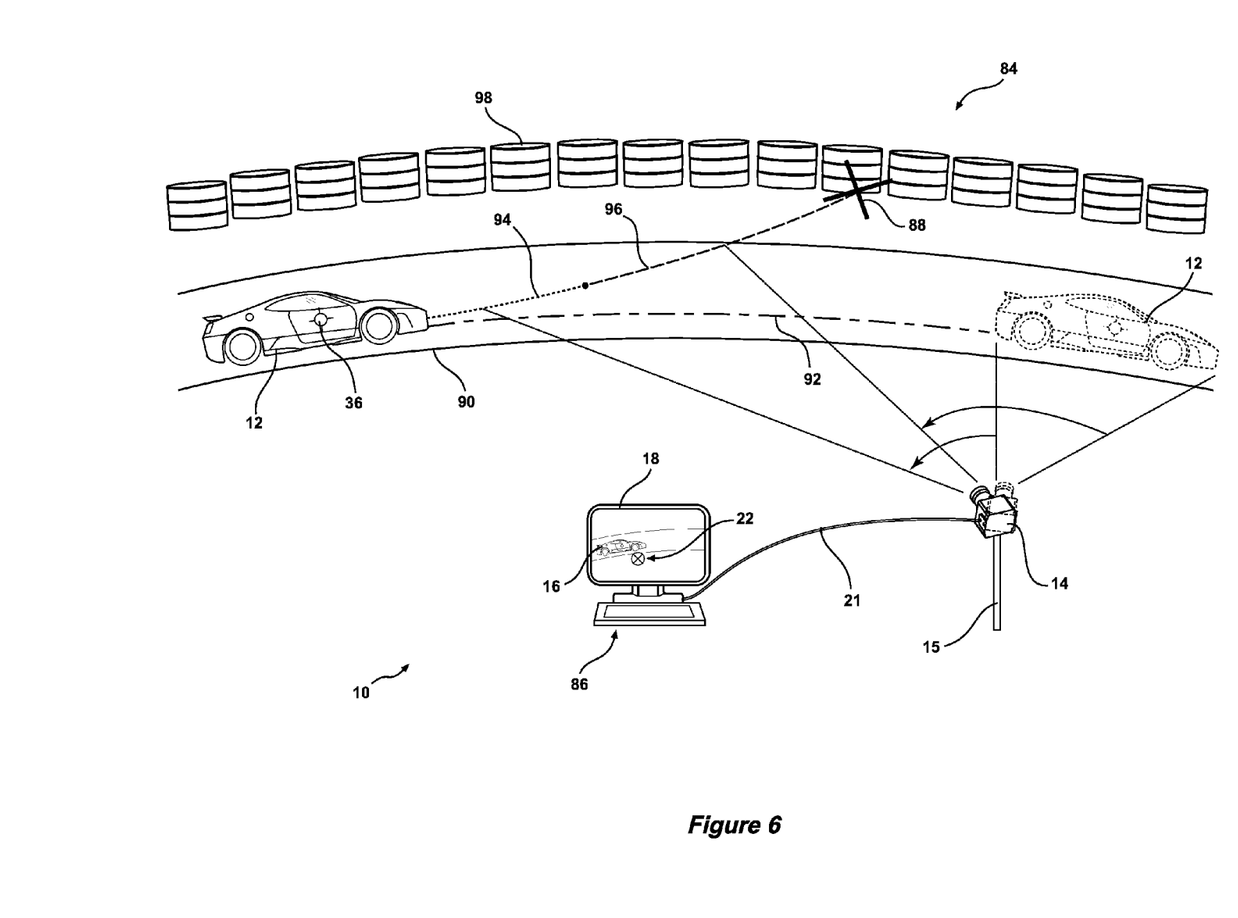
FIG. 6 is a schematic view illustrating the crash aware function of the present invention.

In a further embodiment of the invention, as illustrated in FIG. 6, the apparatus 10 incorporates a vehicle crash event function 84. In such an embodiment 84 the camera 14 is configured to selectively follow the movement of a vehicle 12 to which a tag device 36 is attached and a controller 86 configured to analyse the movement of a tagged vehicle 12 to anticipate if said vehicle 12 is going to be involved in a future crash event 88, the controller 86 including a virtual map of the race course 90 and a data source having information relating to expected vehicle race lines 92, cornering ability and recommended maximum cornering speed, wherein if said vehicle 12 deviates 94 from the expected race line 92, has no chance of making a corner, or has a cornering speed that exceeds the recommended maximum cornering speed said camera is controlled to follow and frame the movement of the vehicle 12 in a previously specified manner.

In use the tagged race car 12 moves along the race track 90 at known speed and direction. The central processing unit 86 is able to calculate the racing line 92 under the present race conditions such as weather. If the tagged vehicle 12 deviates 94 from this racing line 92 or if the vehicle 12 is approaching a corner at too great a speed the CPU 86 is able to calculate that the vehicle is about to lose control. Since the speed and direction of the vehicle is known the CPU 86 is able to calculate an approximate crash path 96. The system can include information about the layout of the circuit such that the CPU 86 is able to control cameras 14 to capture footage of the impact 88. Live interaction through the joystick is permitted. The camera will stay selected to the accident aware target until lock off by the operator. No automatic commands such as priority targets will override the accident aware command with the exception of another accident aware command. The operator may lock off the accident aware target with another command or delete at any time. Once a target has departed from the track for more than a specified period of time, it is classified as dead. A dead target is tracked but will not activate the accident aware command by being off the race track. A dead target may become alive if it passes onto the track.

The operating system specifies the maximum cornering speeds of vehicles and camber of track surfaces, the acceleration and deceleration rates and specification of time period between deviation from track and when target is classified as dead. This time period may be set as a default of five seconds. Individual cameras can have their preset zoom, centre point and target frame calibrations set as required for each camera location.

The operator can nominate priority targets such as race leaders. When the priority targets enter a camera's viewing area the camera automatically locks on to the priority target and overrides currently selected targets. Priority targets may be set by individual camera operators or by the director.

The various aspects of the invention relate to picture composition and control of a camera or cameras used to obtain footage of an event such as a sporting contest. There are several features covered by the invention including, but not limited to, a tracking system, picture composition, camera controls, and software commands. The reader should appreciate that each of these features can be used in combination or alternatively can be used in isolation from each other.

As the reader will now appreciate when biasing means 22, such as a point 38, are used to restrain the object's image 16 around the preselected position within the picture frame 18 the jerky movement of the camera 14 is reduced which results in footage that is smooth. The point 38 can be positioned anywhere within the picture frame 18 which means that the object's image 16 can be restrained to a position distinct from the actual centre point of the picture frame 18. This is useful for compositional control and allowing for screen graphics. The marker point 38 has a magnetic weighting, which attracts the object 12. Accordingly, the camera 14 is adjusted to thereby restrain the movement of the object's image 16 within the picture frame 18 such that the object's image 16 moves or drifts around the point 38 as illustrated by dotted line 20.

To further assist in the explanation of the invention FIGS. 7a-7c and 8a-8c illustrate two different embodiments using different combinations of biasing means.

Figure 7A:
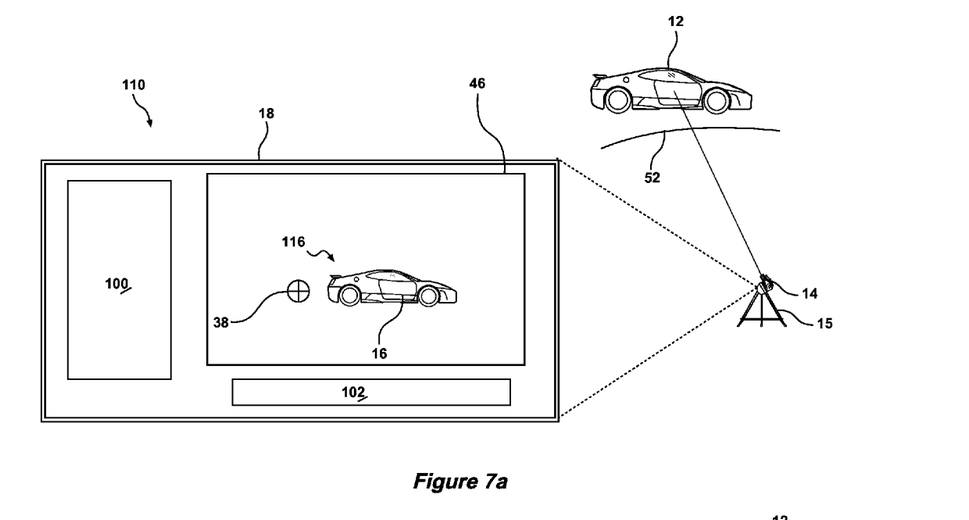
FIG. 7a is a schematic view of another embodiment of the present invention where a first and second biasing means are used to control the position of the image within the camera's picture frame.
Figure 7B:
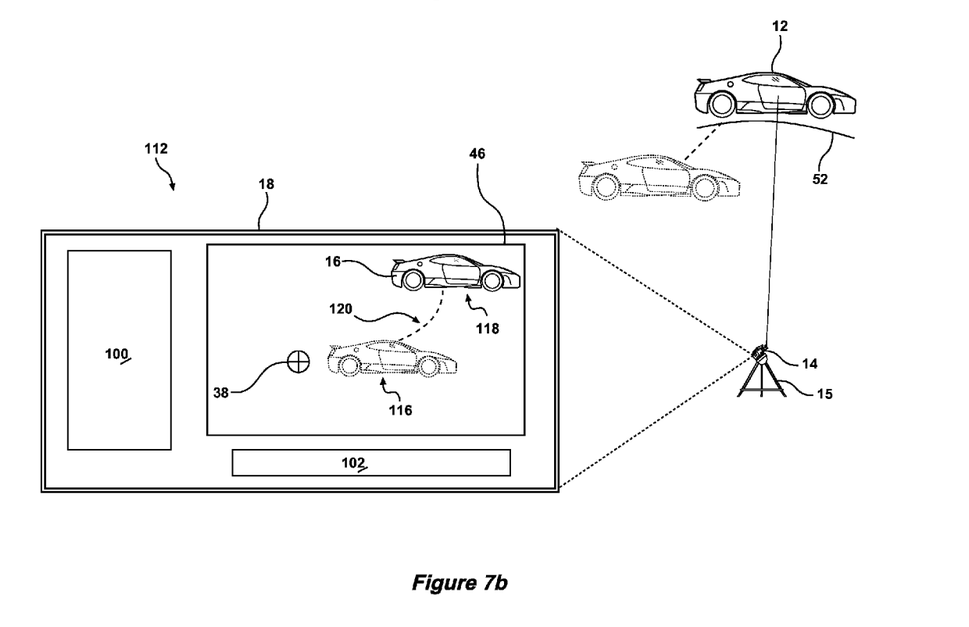
FIG. 7b is a schematic view of FIG. 7a illustrating the image of the tracked objected in a second position within the camera's picture frame.
Figure 7C:
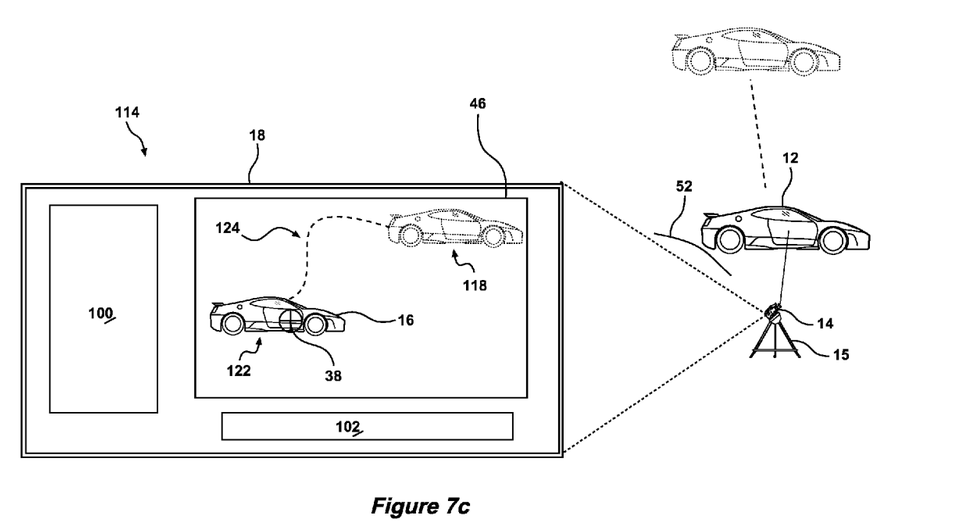
FIG. 7c is a schematic view of FIG. 7b illustrating the image of the tracked objected in a third position within the camera's picture frame.

Turning firstly to FIG. 7a-7c there is illustrated one embodiment where a biasing means are a point 38 and target frame 46. The target frame 46 constrains the image 16 of the target 12 into a set area of the camera's picture frame 18. In this way advertising, scores or statistics can be positioned within regions 100 and 102 of the camera's picture frame 18. This means that the regions 100 and 102 can overlay the picture captured by the camera 14 without the image 16 of the target 12 going behind the advertising, scores or statistics, which would irritate the viewer.

FIGS. 7a-7c illustrate sequential still pictures 110, 112, 114 captured by camera 14 mounted and pan tilt head and tripod 15. For discussion purposes the image 16 of the object 12 starts at position 116 within the camera's picture frame 18, as illustrated in FIG. 7a. In the present embodiment the position of the image 16 is attracted towards point 38 and repelled away from target frame 46 wherein the image is retained with the target frame 46.

Although the image 16 is attracted towards point 38, when the camera system is tracking a fast moving object the image 16 is permitted to drift within the target frame 46.

Accordingly, depending upon where the image 16 is within the camera's picture frame 18 either one of the biasing means, in the present embodiment the point 38 or target frame 46 has precedence over the other biasing means when determining the position of said image 16 within the next still pictures of the video footage.

FIG. 7b illustrates a situation where the object 12 moves rapidly around race course 52 in a direction, as indicated by the broken lines, and the position of the image 16 is allowed to drift from position 116 to position 118, within the target frame 46, as illustrated by line 120, to ensure the footage is not jerky. However as the image 16 approaches the edge of the target frame 46 at position 118 the image 16 is repelled away from the edge of target frame 46 such that it is retained therein.

The position of the image 16 is then repelled away from the edge of the target frame 46 to thereby retain the image 16 within the limits of the target frame 46. FIG. 7c illustrated the movement of the image 16 from position 118 to 120 as indicated by line 124. The position of the image 16 in preferentially centred around point 38, however the image is able to move away from this point to reduce jerky footage and to create a cinematic quality whereby the movement of the object 12 is reflected in the movement of the image 16 within the camera's picture frame 18.

The position of the image 16 within one of said sequential still pictures is biased towards, or away from, the position of one of the biasing means, either 38 or 46 in the present embodiment, with respect to the position of said image 16 of the moving object 12 in a preceding still picture of said sequential still pictures 110, 112, 114.

One of the advantages of the use of multiple biasing means that are hierarchically orders means that, for instance in the present embodiment the point 38 is able to be positioned at any location within the target frame 46.

Figure 8A:
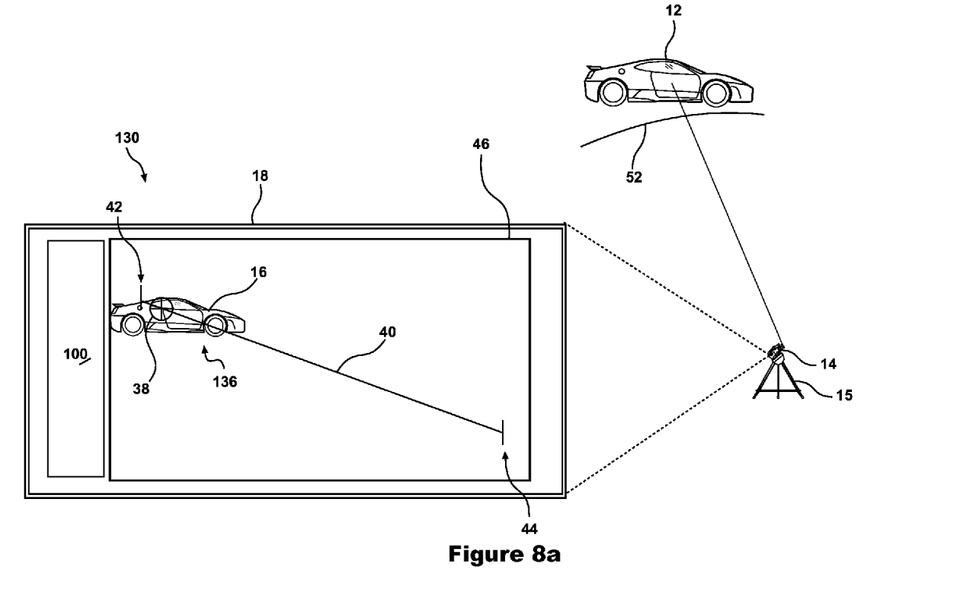
FIG. 8a is a schematic view of yet another embodiment of the present invention where first, second and third biasing means are used to control the position of the image within the camera's picture frame.
Figure 8B:
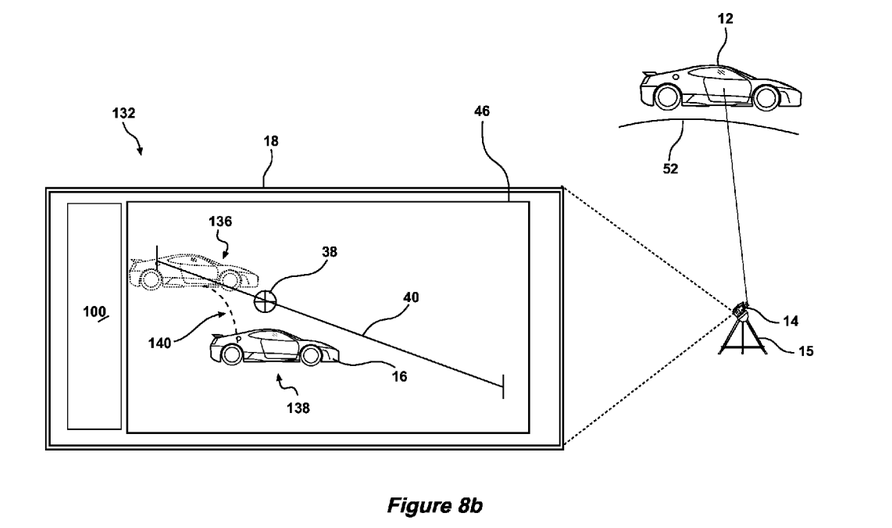
FIG. 8b is a schematic view of FIG. 8a illustrating the image of the tracked objected in a second position within the camera's picture frame.
Figure 8C:
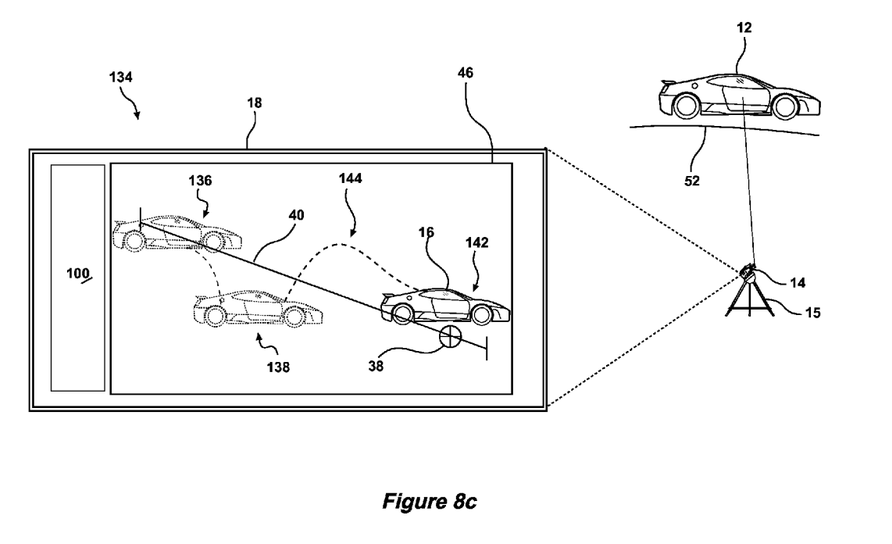
FIG. 8c is a schematic view of FIG. 8b illustrating the image of the tracked objected in a third position within the camera's picture frame.

In another embodiment as illustrated in FIGS. 8*a* to 8*c* three biasing means are used, being a point 38, line 40 and target frame 46. The point 38 is movable along the line at a selectable speed from start point 42 to end point 44. The FIGS. 8*a*-8*c* illustrate sequential still pictures 130, 132, 134 captured by camera 14 mounted and pan tilt head and tripod 15.

The image 16 starts at position 136 within the target frame 46, as illustrated in FIG. 8*a*. Then as the object 12 moves rapidly the image 16 is permitted to move away from the point 38 to position 138 as illustrated by dotted line 140. However the movement of the image 16 is generally along the line 40 as the point 38 moves to the second position along the line, as shown in FIG. 8*b*. The image 16 is prevented from moving outside of the target frame 46 at all times in the present embodiment.

Finally, as illustrated in FIG. 8*c*, the image 16 moves to position 142 along the path as illustrated by dotted line 144 where it is biased towards point 38 as it reaches the end point 44. The movement of one of the biasing means, in the present embodiment the point 38 means a certain amount of control over the position of the image within the camera's picture frame 18 while still permitting the drift of the picture 16 to inhibit jerky footage being produced.

The first and the second biasing means are selected from a group containing, but not limited to, a point having x and y coordinates within the camera's picture frame, a line, having a series of x and y coordinates, traversing at least a portion of the camera's picture frame, or a target frame comprising a portion of the camera's picture frame, such that the position of the image of said object within the camera's picture frame is biased towards or away from, said point, line, or target frame, as the sequential still pictures of the video footage are captured by said at least one camera. Preferably the first and second biasing means are different. It should be appreciated that although the line biasing means is illustrated as being generally straight the line may be curved or follow a serpentine.

The use of at least two biasing means has advantage over the prior art in obtaining footage that is less jerky and more aesthetically pleasing, for sporting and motor sport contests. The biasing means are used to position the target within the picture frame, while still allowing a degree of movement to inhibit jerky footage being captured.

The use of the first and second biasing means provides greater control of the position of the object within sequential still pictures while inhibiting jerky footage and creating more aesthetically pleasing footage. The hierarchical ordering of the first and second biasing means also ensures that depending upon the shooting conditions the position of the image can be controlled to vary the influence of both of said biasing means.

This ensures that if there is rapid movement of the object being followed, the camera is still able to follow the action while inhibiting any jerky movements that would cause discomfort to the viewer. For instance where the first biasing means is a point that attracts the position of the image and the second biasing means is a target frame that repels the position of the image, and the object changes direction quickly the position of the object drift towards the edge of the target frame and then is repelled away from the target frame and towards the first biasing means without resulting in jerky footage that would cause viewer discomfort. These biasing means enable the camera operator or director to pre-compose the look of the video and enable the current invention to accurately capture the desired video in real time in accordance with the desired requirements.

Furthermore, one of said first or second biasing means can be moved with respect to the camera's picture frame such that the position of the target within the resultant still pictures is caused to change over time.

The skilled addressee will now appreciate the many advantages of the present invention. The invention overcomes the issues relating to the reliance on human accuracy and agility to focus on and frame a subject. The system can be used to frame a target moving at high speed such as a racecar or football without producing erratic footage and with the desired aesthetic appeal.

Various features of the invention have been particularly shown and described in connection with the exemplified embodiments of the invention, however, it must be understood that these particular arrangements merely illustrate and that the invention is not limited thereto. Accordingly the invention can include various modifications, which fall within the spirit and scope of the invention. It should be further understood that for the purpose of the specification the word "comprise" or "comprising" means "including but not limited to".

What is claimed is:

1. An apparatus for capturing video footage of at least one moving object, on a racecourse or sporting field, the video footage including sequential still pictures each containing a respective image of said at least one moving object, the apparatus comprising:

at least one camera mounted on a pan tilt head being configured to follow the movement of said at least one moving object, to thereby capture said video footage; and a controller in communication with the pan tilt head, for controlling the pan and tilt thereof, the controller being used to set the position of a first and a second biasing means with respect to the limits of a picture frame of said at least one camera, wherein the first and second biasing means are ordered hierarchically by the controller, wherein the position of the image of said at least one moving object with respect to the camera's picture frame, is influenced by both said first and second biasing means, to control the position of said image of the at least one moving object within said sequential still pictures captured by the camera, said first biasing means having precedence over said second biasing means when determining the position of said image, the movement of said pan tilt head or heads being controlled to obtain video footage, such that the position of the image within one of said sequential still pictures is biased towards, or away from, the position of said first or second biasing means with respect to the position of said image of the moving object in a preceding still picture of said sequential still pictures.

2. The apparatus according to claim 1, wherein the first biasing means is selected from a group containing, a point having x and y coordinates within the camera's picture frame, a line, having a series of x and y coordinates, traversing at least a portion of the camera's picture frame, or a target frame comprising a portion of the camera's picture frame, such that the position of the image of said object within the camera's picture frame is biased towards or away from, said point, line, or target frame, as the sequential still pictures of the video footage are captured by said at least one camera.

3. The apparatus, according to claim 2, wherein the second biasing means is selected from a group containing, a point having x and y coordinates within said camera's picture frame, a line traversing at least a portion of said camera's picture frame, or a target frame comprising a portion of said camera's picture frame, the second biasing means being different to said first biasing means.

4. The apparatus according to claim 1, wherein the first and second biasing means are movable relative to each other while said camera is capturing said video footage.

5. The apparatus according to claim 3, wherein the first or the second biasing means is a target frame and the position of the image of said moving object within the camera's picture frame of one camera is biased away from the edge of said target frame, such that the image of the moving object in the sequential still pictures is retained within said target frame, wherein said camera being controlled to zoom in, or out, when a plurality of moving objects are selected such that they are all retained within said target frame, or said camera being controlled to zoom in, or out, to retain said moving object, or plurality of moving objects, and a static tagged object, located on or around the race course or sporting field, within said target frame.

6. The apparatus according to claim 1, wherein a plurality of moveable cameras supported on respective pan tilt heads are controlled by said controller, an active or passive tag device being attached to each of said at least one moving object, whereby said controller is in communication with said tag device, such that at least one of said plurality of moveable cameras is controlled to tracks the movement of said at least one moving object, to obtain said video footage thereof, the controller being used control said plurality of moveable cameras to follow said at least one moving object, or to set an average position when more that one moving object is being followed and control the movement of the respective pan tilt heads of said plurality of movable cameras to follow said average position, or the controller identifies and ranks the moving objects when more than one moving object is being followed to determine which individual object will be followed to obtain said footage.

7. A method of tracking at least one moving object on a racecourse or sporting field with at least one camera to obtain video footage of the moving object, the footage comprising sequential still pictures each containing a respective image of said at least one moving object, the method comprising the steps of:
   using a controller to set the position of a first and a second biasing means with respect to the limits of a corresponding picture frame of said at least one camera;
   determining which of said first and second biasing means has precedence and using the controller to order the first and second biasing means hierarchically;
   controlling the at least one camera mounted on a pan tilt head using said controller to track the movement of the moving object, the pan tilt head being configured to pan and tilt to enable said, at least one camera, to capture said video footage of the moving object; and
   adjusting the movement of said pan tilt head or heads by way of the controller, such that the position of the image of said moving object within the camera's picture frame, is influenced by said first and said second biasing means, such that the position of the image within one of said sequential still pictures is biased towards, or away from, the position of said first or second biasing means with respect to the position of said image of the moving object in a preceding still picture of said sequential still pictures.

8. The method according to claim 7, wherein the first or the second biasing means, is a point having x and y coordinates within the camera's picture frame, or a line traversing at least a portion of the camera's picture frame, or a target frame comprising a portion of the camera's picture frame, the first and second biasing means being movable relative to each other while said camera is capturing said video footage.

9. The method according to claim 7, wherein a plurality of tagged objects are followed to capture said video footage, the method including the further step of ordering the plurality of tagged objects so that the controller can be used to select and deselect objects that will be followed to capture said video footage.

10. The method according to claim 9, wherein a broadcast manager is in control of said at least one camera and the ordering of said tagged objects by way of said controller, wherein said manager determines the video footage to be obtained and is able to move the position of any one of said biasing means with respect to the limits of the camera's picture frame.

11. The method according to claim 7 including the further step of selectively controlling the position, size, and movement, of the image of said moving object within said picture frame, and the period of time that the moving object is followed by an individual camera to capture said video footage.

12. The method according to claim 7, including the further step of identifying a geographical area on said racecourse or sporting field, or a boundary of said racecourse or sporting field, or an expected race line on said racecourse that when reached, or crossed, or deviated from, will activate said controller to control at least one camera to follow said moving object based upon a plurality of computer coded instructions.

13. The method according to claim 7, wherein a plurality of cameras positioned around said racecourse or sporting field are controlled using the same biasing means settings and target selection.

14. The method according to claim 7, wherein said first and second biasing means, and a third biasing means are used to influence the position of the images of said moving object within said sequential still images, as delineated by said picture frame of a respective camera, said first, second and third biasing means being ranked hierarchically to determine which biasing means has precedence over the other biasing means.

15. The method according to claim 14, wherein the first biasing means is a point within the camera's picture frame, the second biasing means is a line traversing at least a portion of said camera's picture frame, and the third biasing means is a target frame comprising a portion of said camera's picture frame.

* * * * *